United States Patent Office 3,674,547
Patented July 4, 1972

3,674,547
COMPOSITE MATERIAL AND PROCESS FOR PREPARING SAME
Thomas M. Noone, Oak Park, Ill., assignor to The Richardson Company, Melrose Park, Ill.
No Drawing. Filed Feb. 18, 1970, Ser. No. 12,467
Int. Cl. B32b 27/40
U.S. Cl. 117—135.5                                    12 Claims

ABSTRACT OF THE DISCLOSURE

Breathable synthetic composites for articles of clothing including shoe uppers are provided by laminates composed of open-cell synthetic foams and a polyurethane film which is resistant to water transfer. A particularly useful composite comprises a polyvinylchloride open-cell foam and a thermoplastic polyurethane film containing a plasticizer such as tri-butoxyethyl phosphate to improve moisture-vapor transmission properties of the composite.

BACKGROUND

This invention relates to the preparation of breathable synthetic composites and more particularly to those composites having high moisture-vapor transfer properties while being essentially resistant to water transfer.

Synthetic composites are known for use in the manufacture of shoe uppers and various other articles of clothing and accessories. In a number of instances, they exhibit properties not alawys available from leather and other natural products.

However, previous breathable synthetic composites have not always been entirely satisfactory. There is a need for new materials which offer advantages in the trade.

SUMMARY

Briefly, my invention is directed to a breathable composite composed of an open-cell synthetic foam and on a surface thereof, a polyurethane layer or coating. Particularly useful foams are the open-cell vinyl halide polymers such as polyvinylchloride. In addition, improved polyurethane films are provided by the incorporation of a plasticizer such as tri-butoxyethyl phosphate into the polyurethane.

DETAILED DESCRIPTION

Useful open-cell synthetic foams for purposes of this invention include those composed of vinyl halide polymers, polystyrene, polyethylene, polyurethane, polyester and the like. Exemplary foams of this type are disclosed in U.S. 3,170,832, U.S. 3,288,729 and British 1,124,121. Advantageously, the foams are composed of vinyl polymers such as polystyrene, polyethylene, polyvinyl chloride and copolymers of vinyl chloride, vinyl acetate and the like.

One method of preparing these foams is by beating air into plastisols containing surface active materials and heating the foamed plastisols to provide a cure and form open-cell foams. Plasticizers and other modifiers are combined with the polymer prior to foaming to improve various properties of the resultant foam.

Usually, the synthetic foam is prepared in sheet form and in some instances attached directly to a fabric backing. Various fabrics such as cotton, nylon, polyester and the like are useful for this purpose.

In addition to the open-cell synthetic foam, the composite of the invention includes a polyurethane layer or coating on the foam. Polyurethanes useful for this purpose include both thermoplastic and thermosetting materials as disclosed in U.S. 3,360,394. In a number of instances, thermosplastic polyurethanes are selected because they tend to have better surface properties for such purposes as embossing. Particularly useful thermoplastic polyurethanes are products known as Estane (B. F. Goodrich Chemical Company) which can be either polyester-urethane or polyether-urethane.

The composite can be prepared by first forming the polyurethane film and then spreading the foamed plastisol on the film and forming the open-cell foam in place. In this preparation, the polyurethane film is first formed on release paper, glass sheets, or the like. Usually, a plurality of coats are formed to produce a layer or film resistant to water transfer. Solvents such as toluene and dimethylformamide (DMF), and the like are used for coating purposes with the solvent being removed by heat at temperatures of about 150–250° F. after each coat.

The foamed plastisol is then placed on the polyurethane film and the open-cell foam formed and cured in place at temperatures sufficient to cure the foam. Usually, the temperature is about 300–450° F. and more usually about 350–400° F.

Another method of forming the composite is by first forming and curing the open-cell foam. The the polyurethane film is applied to the foam.

Usually the first method is advantageous for articles of clothing since the polyurethane film can be first embossed with the desired surface characteristics.

Improved performance of the polyurethane as a moisture vapor transfer medium is accomplished through the use of a particular plasticizer or plasticizers. These are incorporated into the polyurethane in sufficient amounts to provide the desired improvement in moisture vapor transmission (MVT). Generally, the amount exceeds about 1 part per hundred parts of resin and more usually about 5–70 phr., although this range is somewhat dependent on the particular plasticizer and its compatibility with the particular polyurethane.

The incorporation of the plasticizer is carried out by adding the desired amounts to the polyurethane or by adding plasticizer to the plastisol before forming the open-cell foam on the polyurethane film. In the latter process, the plasticizer is transferred into the polyurethane and provides the desired results.

In general, not all plasticizers perform equally well. As an illustration, the use of 50 phr. of tricresyl phosphate in a thermoplastic polyester-urethane provides an MVT of about 223–233 while about 50 phr. of tri-butyl-phosphate in the same polyurethane provides a MVT of about 1046–1073. Generally, the improvement is provided by plasticizers which are compatible with the polyurethane in the desired amounts. Also, those having a solubility for water of at least 0.5 weight percent are particularly useful. Illustrative solubilities can be found in "Plasticizers and Phosphorus Chemicals" published by the Organic Chemicals Division of the FMC Corporation, 633 Third Avenue, New York 10017.

Suitable plasticizers include tri-butoxyethoxyethyl phosphate, tri-butoxyethyl phosphate, tributyl phosphate, triethoxyethoxyethyl phosphate, di-ethoxyethoxyethyl phthalate, di-methoxyethyl phthalate, di-butoxyethyl phthalate, tricresyl phosphate, dioctyl phthalate, and the like with those with solubilities for water of at least 0.5 weight percent being preferred.

Advantageously, the composite of the open-cell foam and polyurethane film includes one or more plasticizers compatible in both layers of material. Particularly with polyvinyl chloride foam, I have found that the laminate formed with a plasticizer compatible with both the polyvinylchloride and polyurethane aids in the production of a laminate wherein the layers are permanently joined together to a degree not found with incompatible plasticizers. In some instances, it is often useful to provide an isocyanate in the polyurethane to produce an improved laminate of the polyvinylchloride and polyurethane.

In addition, various fillers, stabilizers, and other additives can also be incorporated into the composite materials. The amounts selected are well known to those versed in this art.

The composites of the invention not only possess a desirable permeability to air and water vapor, but they are practically impervious to water in the liquid phase. They offer advantages for shoe uppers and other articles of clothing apparel used in an environment of high moisture concentrations. The polyurethane, in addition, offers the advantages of appearance, wear and other benefits associated with polyurethanes.

The following examples illustrate some of the embodiments of this invention. It is to be understood that these are for illustrative purposes only and do not purport to be wholly definitive to conditions or scope.

Example 1

A composite was prepared from a thermoplastic polyurethane and polyvinylchloride open-cell foam. Initially, two individual coats of a polyether urethane (about 30 wt. percent solution in DMF-toluene) were formed on a glass plate (coated with a release agent). The first coat was prepared by spreading the solution using a Gardner knife set at about 6 mils and then dried at about 200° F. for about 3 minutes. The same procedure was followed for the second coat except for a Gardner knife setting of about 7 mils.

A polyvinylchloride foam was prepared by whipping air into a plastisol of the following formulation:

| Components: | Parts by weight |
|---|---|
| PVC (Geon 121) | 100 |
| Tri-butoxyethyl phosphate | 70 |
| Epoxy stabilizer | 5 |
| Vinyl stabilizer | 3 |
| Silicone surfactant | 12 |

The foam was spread on the dried polyether urethane film using a Gardner knife setting of about 50 mls. A cotton fabric (about 6.5 oz./yd.$^2$) was then laid on the wet foam and the entire laminate and glass plate were heated in an oven at about 380° F. for about 9 minutes.

The resultant composite was an open-cell polyvinylchloride foam between a fabric layer and a polyether-urethane film as the topskin. The composite was about 60 mils. In addition, the film contained about 25 phr. of plasticizer because of the migration of the tri-butoxyethyl phosphate into the urethane film.

The MVT (moisture vapor transmission) of the composite was measured by placing a sample over the opening of a glass bottle containing water. The sample was held by a cap whose center portion was removed to expose an area (about 2.8 in.$^2$) of the sample. The bottle was placed in a constant temperature water bath kept at about 90° F. The test results (loss in weight) represented grams/sq. meter/24 hrs. and were recorded for each hour over a period of about 5 hours. The results were as follows:

TABLE I

| Time, hr.: | MVT |
|---|---|
| 1st | 250 |
| 2nd | 317 |
| 3rd | 346 |
| 4th | 372 |
| 5th | 384 |

Example 2

A similar composite to that in Example 1 was prepared from the same components except that dioctyl phthalate was substituted for the tri-butoxyethyl phosphate as the plasticizer and the thickness of the sample was about 52 mils. The MVT's obtained were as follows:

TABLE II

| Time, hr.: | MVT |
|---|---|
| 1st | 115 |
| 2nd | 110 |
| 3rd | 113 |
| 4th | 120 |
| 5th | 125 |

Examples 3–9

Polyurethane films individually containing various plasticizers and laminated to cotton fabric were prepared by casting onto a glass plate. The thickness of the solution of polyester-urethane laid on the glass plate was controlled using a Gardner knife. The solvent was then removed by placing the glass plate and coating in an oven at about 200° F. for about 3 minutes. Two more coats of the solution were applied on top of the first coat and each coat was dried. A final coat of the polyester-urethane solution was applied and while this was still wet, a light weight (3 oz./sq. yd.) cotton fabric was laid onto this wet layer. The glass plate was then placed into the oven at 200° F. for 3 minutes to remove the solvent.

TABLE III.—MVT VALUES

| | | Weight percent | | | |
|---|---|---|---|---|---|
| Example | Plasticizer | 0 | 7.5 | 25 | 50 |
| | None | 146–166 | | | |
| 3 | Tri-butoxyethyl phosphate | | | 540–624 | 902–910 |
| 4 | Tributyl phosphate | | | | 1,046–1,073 |
| 5 | Di-ethoxyethoxy ethyl phthalate | | | 454–514 | 706–818 |
| 6 | Di-methoxyethyl phthalate | | | 542–569 | 914–970 |
| 7 | Di-butoxyethyl phthalate | | | 425–442 | |
| 8 | Tricresyl phosphate | | | | 223–233 |
| 9 | Dioctyl phthalate | | 161–170 | | |

Example 10

The composite as described in Examples 3–9 was prepared except that the polyurethane was a thermosetting resin (Verona Dyestuffs). The results of MVT tests are in Table IV below:

TABLE IV.—MVT VALUES

| Example | Plasticizer | 0 | 25 | 50 |
|---|---|---|---|---|
| 10 | Tri-butoxyethyl phosphate | | 466–518 | 799–859 |

Examples 11–12

The composite as described in Examples 3–10 was prepared except that the polyurethane was a thermoplastic polyether-urethane. The results of MVT tests are in Table V below:

TABLE V.—MVT VALUES

| | | Weight percent | | |
|---|---|---|---|---|
| Example | Plasticizer | 0 | 25 | 50 |
| | None | 211–214 | | |
| 11 | Tri-butoxyethyl phosphate | | 365–403 | 523–547 |
| 12 | Dioctyl phthalate | | 248–254 | 228–250 |

While the invention has been described in conjunction with specific examples thereof, these are illustrative only. Accordingly, many alternatives, modification, and variations will be apparent to those skilled in the art in the light of the foregoing description, and it is therefore intended to embrace all such alternatives, modification, and variations as to fall within the spirit and broad scope of the appended claims.

I claim:

1. A cured composite material characterized as impermeable to liquid water passage but having high moisture-vapor transfer properties, said material comprising a layer of an open-cell synthetic resin foam and attached to a surface thereof, a layer of a water resistant polyurethane film wherein said film is a thermosetting or thermoplastic polymer, said composite includes a plasticizer at least within the polyurethane film in an amount sufficient to provide moisture vapor transfer properties thereto.

2. The composite material of claim 1 wherein the polyurethane film contains a plasticizer which has a solubility for water of at least about 0.5 weight percent.

3. The composite material of claim 1 wherein the plasticizer is present in an amount from about 1 to 70 weight percent of the polyurethane film.

4. The composite material of claim 1 wherein the open-cell synthetic resin foam is a polyvinylchloride foam.

5. The composite material of claim 4 wherein the polyvinylchloride foam contains a plasticizer compatible with the polyurethane film.

6. The composite material of claim 4 wherein the plasticizer in the polyurethane film has a solubility for water of at least about 0.5 weight percent and is an organic compound.

7. The composite material of claim 6 wherein the polyurethane film is a thermoplastic resin based on a polyester and the plasticizer in the polyurethane is tributoxyethyl phosphate and is present in an amount from about 5–50 weight percent based on the polyurethane film.

8. The composite material of claim 1 wherein the plasticizer is included in the foam layer.

9. A process for preparing a composite material resistant to liquid water transfer but with high moisture-vapor transfer properties, which process comprises incorporating a plasticizer into a synthetic resinous foam in an amount sufficient to provide moisture-vapor transfer properties, depositing the foam as a layer onto a water resistant polyurethane film wherein said film is a thermosetting or thermoplastic polymer, whereby at least a portion of said plasticizer is transferred into the polyurethane film, and heating the composite to convert the foam into a cured open-cell foam on the polyurethane film.

10. The process of claim 9 wherein the resinous foam is a polyvinyl chloride.

11. A process for preparing a composite material resistant to liquid water transfer but with high moisture-vapor transfer property, which process comprises incorporating a plasticizer in an amount sufficient to provide moisture-vapor transfer properties into a water resistant polyurethane film wherein said film is a thermosetting or thermoplastic polymer, depositing a synthetic resinous foam as a layer onto said polyurethane film and heating the composite to convert the foam into a cured open-cell foam on the polyurethane film.

12. The process of claim 11 wherein the resinous foam is a polyvinyl chloride.

References Cited

UNITED STATES PATENTS

| | | | |
|---|---|---|---|
| 3,547,753 | 12/1970 | Sutton | 161—190 X |
| 2,955,056 | 10/1960 | Knox | 117—98 |
| 3,102,825 | 9/1963 | Rogers et al. | 117—98 |
| 3,093,525 | 6/1963 | Wilson et al. | 161—190 X |
| 2,983,962 | 5/1961 | Merz et al. | 161—159 X |
| 3,455,727 | 7/1969 | Dye | 117—138.8 D X |
| 3,130,505 | 4/1964 | Markevitch | 161—159 X |
| 3,173,150 | 3/1965 | Mohler | 117—138.8 D X |
| 3,446,880 | 5/1969 | Enicks | 264—45 |

RALPH HUSACK, Primary Examiner

U.S. Cl. X.R.

117—76 T, 138.8 D, 161 UB, UC; 161—88, 159, 190; 260—2.5 P, 30.6 R, 31.8 R